US011258736B2

(12) United States Patent
Shelley

(10) Patent No.: US 11,258,736 B2
(45) Date of Patent: Feb. 22, 2022

(54) MATCHING AND CONNECTION METHODS AND SYSTEMS REQUIRING VIDEO COMMUNICATION

(71) Applicant: Naza Nicole Shelley, Washington, DC (US)

(72) Inventor: Naza Nicole Shelley, Washington, DC (US)

( * ) Notice: Subject to any disclaimer, the term of this patent is extended or adjusted under 35 U.S.C. 154(b) by 0 days.

(21) Appl. No.: 16/706,758

(22) Filed: Dec. 8, 2019

(65) Prior Publication Data

US 2020/0145813 A1 May 7, 2020

Related U.S. Application Data

(63) Continuation of application No. 16/531,297, filed on Aug. 5, 2019, now Pat. No. 10,548,001.

(Continued)

(51) Int. Cl.

| H04L 12/58 | (2006.01) |
|---|---|
| H04L 51/046 | (2022.01) |
| H04L 65/1073 | (2022.01) |
| H04L 65/1059 | (2022.01) |
| H04L 65/1089 | (2022.01) |

(Continued)

(52) U.S. Cl.
CPC .......... *H04L 51/046* (2013.01); *H04L 51/10* (2013.01); *H04L 65/1059* (2013.01); *H04L 65/1063* (2013.01); *H04L 65/1073* (2013.01); *H04L 65/1089* (2013.01); *H04L 65/403* (2013.01); *H04L 67/306* (2013.01); *H04W 8/18* (2013.01); *H04W 84/18* (2013.01)

(58) Field of Classification Search
CPC ... H04L 51/046; H04L 51/10; H04L 65/1063; H04L 65/1089; H04L 65/403; G06Q 50/01
See application file for complete search history.

(56) References Cited

U.S. PATENT DOCUMENTS

| 7,783,980 B1 * | 8/2010 | Herold | .................... | H04L 51/10 |
| | | | | 715/740 |
| 7,831,917 B1 * | 11/2010 | Karam | ................... | G06Q 10/10 |
| | | | | 715/753 |

(Continued)

OTHER PUBLICATIONS

Catherine Santino, A New Dating App Is Committed to Cutting Down on Sketchy Encounters, www.glam.com, Mar. 12, 2019, https://www.glam.com/relationships/filter-off-dating-app-for-reducing-sketchy-dates/.

*Primary Examiner* — Min Jung
(74) *Attorney, Agent, or Firm* — Robert L Protheroe

(57) ABSTRACT

Methods and systems for matching and connecting people are described and comprise a plurality of user profiles and user accounts associated with a plurality of users wherein a user may be presented with user profiles of candidate matches, matched at least in part on criteria specified by the user. Following mutual match interest indications from two users, a match is created therebetween and a connection is possible, however, the connection between the two users is contingent on a qualified video chat therebetween and mutual connection interest indications therefrom. Communication between two users of a match is restricted and controlled towards satisfying the qualified video chat requirement. Upon establishing a connection, the two users are enabled for ongoing communication with each other.

22 Claims, 4 Drawing Sheets

Related U.S. Application Data

(60) Provisional application No. 62/826,776, filed on Mar. 29, 2019, provisional application No. 62/728,919, filed on Sep. 10, 2018.

(51) Int. Cl.
*H04L 65/403* (2022.01)
*H04L 65/1063* (2022.01)
*H04L 51/10* (2022.01)
*H04W 8/18* (2009.01)
*H04W 84/18* (2009.01)
*H04L 67/306* (2022.01)

(56) References Cited

U.S. PATENT DOCUMENTS

| | | | |
|---|---|---|---|
| 2008/0059580 A1* | 3/2008 | Kalinowski | G06Q 10/107 709/204 |
| 2008/0120390 A1* | 5/2008 | Robinson | H04W 4/021 709/207 |
| 2013/0037609 A1* | 2/2013 | Merritt-Munson | G06Q 10/10 235/380 |
| 2014/0040368 A1* | 2/2014 | Janssens | H04L 67/306 709/204 |
| 2015/0148127 A1* | 5/2015 | Saraf | A63F 13/795 463/31 |
| 2016/0248864 A1* | 8/2016 | Loia | G06Q 50/01 |
| 2019/0239038 A1* | 8/2019 | Bhat | H04L 51/10 |
| 2020/0403956 A1* | 12/2020 | Adamski | G06F 16/54 |

* cited by examiner

| User Purchases Table 300 | |
|---|---|
| PK 302 | User Purchases ID |
| FK 304 | User ID |
| FK 306 | Transaction ID |
| FK 308 | Feature/Service ID |
| 310 | Feature/Service Quantity |
| 312 | Match and Connection ID |

FIG. 3A

| Match and Connection Table 320 | |
|---|---|
| PK 322 | Match and Connection ID |
| FK 324 | First User ID |
| FK 326 | Second User ID |
| 328 | Match and Connection Status |
| 330 | Match Window |
| 332 | First User Match Interest |
| 334 | Sec. User Match Interest |
| 336 | First User Connection Interest |
| 338 | Sec. User Connection Interest |

FIG. 3B

| Feature/Service Table 350 | |
|---|---|
| PK 352 | Feature/Service ID |
| 354 | Feature/Service Description |
| 356 | Basic Offering Availability |
| 358 | Tier 1 Subscription Availability |
| 360 | Tier 2 Subscription Availability |
| 362 | Pay-Per-Use Pricing |
| 364 | Pay-Per-Use Quantity |

FIG. 3C

MATCHING AND CONNECTION METHODS AND SYSTEMS REQUIRING VIDEO COMMUNICATION

CROSS-REFERENCE TO RELATED APPLICATIONS

This application is a continuation of copending U.S. application Ser. No. 16/531,297, filed Aug. 5, 2019, which claims the benefit of U.S. Provisional Application No. 62/728,919, filed Sep. 10, 2018, entitled Matching Process Requiring Video Chat, and claims the benefit of U.S. Provisional Application No. 62/826,776, filed Mar. 29, 2019, entitled Social Connection Methods and Systems Requiring Video Communication, each of which is incorporated by reference herein in its entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

FIELD OF THE DISCLOSURE

The present disclosure relates to methods and systems for connecting (e.g., matching, etc.) people. More particularly, the present disclosure relates to computer implemented methods and systems that require video chat between users prior to allowing further communication therebetween.

BACKGROUND

The complexity of how people interact has dramatically increased in relation to capabilities afforded by internet communication. Electronic communication systems, databases, protocols, and services have been developed for a diverse set of end users in order to navigate the increasing complicated social networks in which human beings are interacting.

For example, the dating market has changed. As more and more singles use online dating as the method of meeting potential mates, a single user's number of potential connections and mates becomes increasingly vast and more complex to navigate. People navigate profiles where an end user may quickly accept or reject candidate matches following a quick glance of a potential match's pictures and brief read of their profile, receive a similar reciprocal choosing paradigm and if both are interested in one another and willing to communicate further (e.g., via text messages), the two parties to a potential match are allowed to communicate. Accordingly, end users spend countless hours choosing candidate matches based on minimal information and once candidate matches are found, end-users often engage in protracted superficial text messaging before meaningful conversation takes place. Furthermore, an end user may initiate interest in a large number of candidate matches with little consideration to priority or urgency of follow-through, leaving many matches predominantly inconvenienced with little chance of eventual benefit.

Moreover, as the dating profiles typically rely on pictures and brief descriptions of people, these superficial text messages are often with a person different than who is shown or described. This form of identity deception in online dating is known as "catfishing." In catfishing, a person may create a fake identity on a social networking account pretending to be someone they are not with an intent to lure potential connections into a false relationship.

The foregoing discussion is presented solely to provide a better understanding of the problems confronting the art and should not be construed in any way as an admission of prior art, nor should citation of any reference herein be construed as an admission that such reference constitutes prior art to the instant application.

SUMMARY

Requirements for electronic communications systems usable by users to identify other users to a potential relationship may include providing users with the ability to identify possible parties of interest and assess identified parties, thereby allowing users to make a determination of their desire to have a connection therewith. However, given a general ease and disinhibition that can be characteristics of communicating electronically, combined with abilities to identify and assess users of potential interest, a result is that many electronic communications systems suffer from detrimental electronic communications between users. Examples of such detrimental communications may be characterized by one or more of the following terms and phrases: superfluous, superficial, frivolous, briefly considered, given little thought, indiscreet, insincere, careless, and the like. Furthermore, given an ability to shield one's true self when using an electronic communications system, such systems can suffer from misrepresentations made by users. As a result, users of electronic communications systems attempting to identify other users to a potential relationship can find the use of such systems to be futile, by pursuing connections that may be based on misrepresentations. Users of electronic communications systems can further find the use of such systems to be ineffective and inefficient, due to the difficulties and wasted time of sorting through excess and detrimental communications from users who may have given little or no consideration to their level of interest, and/or may be disingenuous regarding their interest.

Various methods and systems for efficiently arranging connections between people, also referred to as users of the system (or simply users) are disclosed. According to some possible implementations, methods and systems may be used to facilitate dating between people, and may be partially premised on preventing typical routes of communication between two users of a connection service who have identified each other as a potential match until the two users have video chatted with one another. In some implementations, each pair of users in a match are required to video chat with each other for a certain amount of time before an enabling of any further communication between the users is possible. In some implementations, controlled communication related to video chat scheduling may be facilitated prior to a video chat that satisfies qualification requirements. The systems and methods described herein may be configured to allow users to engage in online dating more efficiently by reducing the time wasted with incompatible matches typically plaguing other social networking sites.

In some implementations, a connection method and system may comprise a plurality of user devices connected over a communications network via a plurality of communications links to a server based application services system, thereby providing access to a plurality of user accounts by a plurality of users. The application services system may comprise an application services interface module (e.g., a communications interface layer), application software modules and data services (including services such as one or more databases) through which users may create and interact with user accounts. The application software modules may include a user account management module, a user profiles management module, a candidate matching and selection module, a match and connection management module and a user services and policies module. Users may access a user account management module and a user profiles management module to create a user account and a user profile which may be stored within a database of data services and the user profiles may be used by other users to consider users associated with the user profiles, and in response to such consideration, to provide an interest indication in further communication with a user associated with a considered user profile, also referred to as a positive interest indication, or to provide an interest indication of no such further communication, also referred to as a negative interest indication. In some implementations, users may specify criteria, such as filtering, selecting and matching criteria, also referred to as match settings, such that they may access and consider user profiles of other users that match, at least in part, their specified criteria. In some implementations, user match settings may be associated with their user account or user profile and stored by data services for subsequent retrieval and use in accessing matching user profiles in response to a request for matching user profiles, which may be referred to as candidate matches. In some implementations, users may specify match settings as part of a request for matching user profiles (candidate matches).

Users may access user account management module and candidate matching and selection module to request candidate matches, whereupon candidate matching and selection module may access data services to determine a pool of (e.g., a set of) user profiles matching, at least in part, match settings specified by the requesting user. The user may then when provided one or more candidate matches, consider associated user profiles, or portions thereof, from the provided candidate matches and provide a positive match interest indication or a negative match interest indication regarding their interest in further communication with each of the candidate matches they consider. As such, two users may request, consider and provide match interest indications in candidate matches, such that they each receive the other user's user profile, and indicate a positive match interest in further communication with the other user, thereby resulting in mutual positive match interest indications, wherein the latter occurring of the two may be referred to as a reciprocal positive match interest indication. Upon a reciprocal positive match interest indication, a match may be created between the pair of users having indicated mutual positive match interest indications in each other.

In some implementations, after a match is created, a next interaction between the two users of the match is required to be through a qualifying video chat or in regards thereto, such as the initiation or the scheduling of the qualifying video chat. As such, in some implementations, a limited communication between the pair of matched users regarding the initiation or the scheduling of the qualifying video chat may be facilitated. A user account management module and match and connection management module may facilitate a controlled communication between the pair of matched users comprising a qualifying video chat, wherein the two users attempt to successfully complete a qualifying video chat, wherein a successfully completed qualifying video chat may be referred to as a qualified video chat, and an unsuccessful qualifying video chat may be referred to as a failed video chat. In some implementations, there may be a requirement to video chat within a time window, which can also be referred to as a chat time window, wherein a time window may commence at a time in relation to the creation of a match, such as the time a match is created. In some implementations, if a chat time window requirement is not met, then the match may expire or may be otherwise inactivated upon the expiration of the chat time window. In some implementations, there may be a requirement for a qualifying video chat time duration to exceed a minimum qualification time, thereby satisfying a qualification requirement, to be determined as successful and become a qualified video chat, and those not meeting the minimum qualification time may thus be determined to be failed video chats. In some implementations, a facilitation of controlled communication may include a plurality of facilitating functions, such as notifications and review capabilities by users of their matches, management of match expirations with respect to their respective chat time windows, scheduling and review capabilities by users of their scheduled video chats, hosting of, or controlling a host of, the video chats and determinations of success or failure of meeting qualification requirements of qualifying video chats. In some implementations, upon completion of a successful qualifying video chat, namely, a qualified video chat, each of the two users of the pair of matched users which engaged in the qualified video chat may provide a second interest indication regarding the other user, wherein the second interest indication may be a positive connection interest indication or a negative connection interest indication regarding their interest in further communication with the other user. If there is mutual positive interest thereby resulting in mutual positive connection interest indications, wherein the latter occurring of the two may be referred to as a reciprocal positive connection interest indication, a connection may be created between the two users and further communication may be enabled, wherein they may be able to communicate with each other in an ongoing fashion.

In some implementations a user account management module may manage user interaction with a user services and policies module and allow users of the connection system to request or access user assistance and other support services, such as to address questions regarding system functionality and services, and to access and report policy rules and concerns. In some implementations data services may provide data storage and access thereto for data, such as data including, user account data, user profile data, user interest indication data, match data, video chat data, connection data, user policy data and user services data.

A detailed disclosure of various example implementations which may relate to one or more aspects of the foregoing summary disclosure is provided following a brief description of the drawings.

BRIEF DESCRIPTION OF THE DRAWINGS

The accompanying drawings, which are included to provide a further understanding of the disclosed subject matter, are incorporated in and constitute a part of this specification. The drawings also illustrate example implementations of the disclosed subject matter and together with the detailed description serve to explain the principles of the disclosed subject matter.

FIG. 3A is an example implementation of a user purchases table.

FIG. 3B is an example implementation of a match and connection table.

FIG. 3C is an example implementation of a feature/service table.

DETAILED DESCRIPTION

Figure 1A:
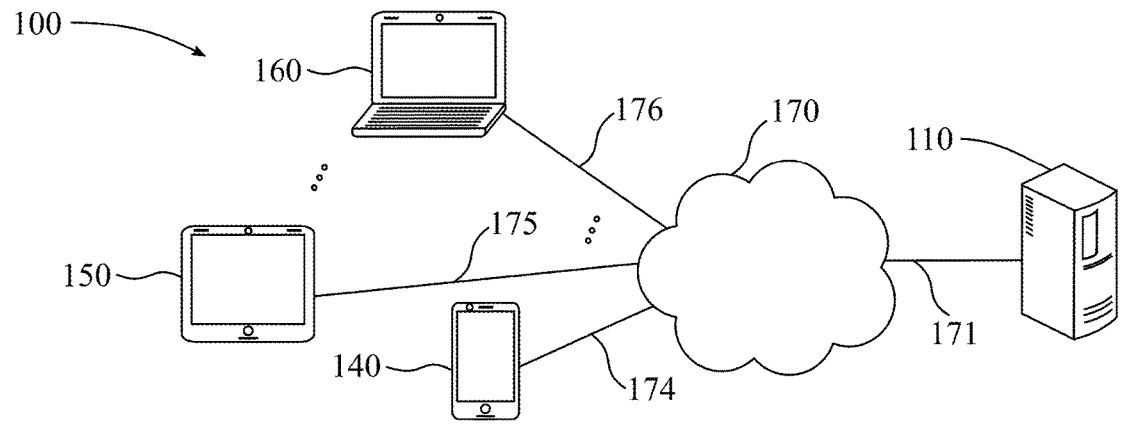
FIG. 1A is a system diagram of an example implementation of a connection system.

Various detailed example implementations of a connection method and system are disclosed herein; however, it is to be understood that the disclosed implementation are merely illustrative and may be embodied in various forms. In addition, each of the examples given in connection with the various implementations is intended to be illustrative, and not restrictive.

The following detailed example implementations refer to the accompanying drawings. The same reference number may appear in multiple drawings and when appearing in multiple drawings will identify the same or similar elements. For brevity, a reference number and its referenced element will be disclosed in accompanying text herein and generally in relation to a first appearance in the drawings, but may not be explicitly referred to in accompanying text again when appearing in subsequent drawings.

System Configuration

A connection method and system as disclosed herein may comprise a plurality of user accounts and a server based application services system that may be in communication with a plurality of user devices, such as a smartphone, which may comprise a connection application for interacting with a connection method and system and/or may access a connection application comprised by a connection system, thereby providing access to a plurality of user accounts by a plurality of users. In some implementations, the connection application is a dating application which facilitates connections and dating between users. Referring to FIG. 1A, a system diagram of an example implementation of a connection system 100 is shown. Connection system 100 comprises application services system 110, such as a server based system comprising one or more servers, software and data services comprising one or more databases, and may be a cloud-based system. Connection system 100 may further comprise a plurality of user devices 140, 150 and 160 enabling a plurality of users to interact with the connection system 100 via a network 170 comprising a plurality of communications links 174, 175, 176 and 171 providing a networked communications interconnection of user devices 140, 150 and 160 to application services system 110, wherein links 174, 175, 176 and 171 are also respectively comprised by user devices 140, 150 and 160 and system 110. The plurality of user devices 140, 150 and 160 may be of various types of user devices which are capable of real time video chat communication by a device user, and communication over communication network 170 and communication links 174, 175 and 176, and are shown in FIG. 1 A as illustrative examples as a smartphone 140, a tablet 150 and a computer 160.

Application Services

Figure 1B:
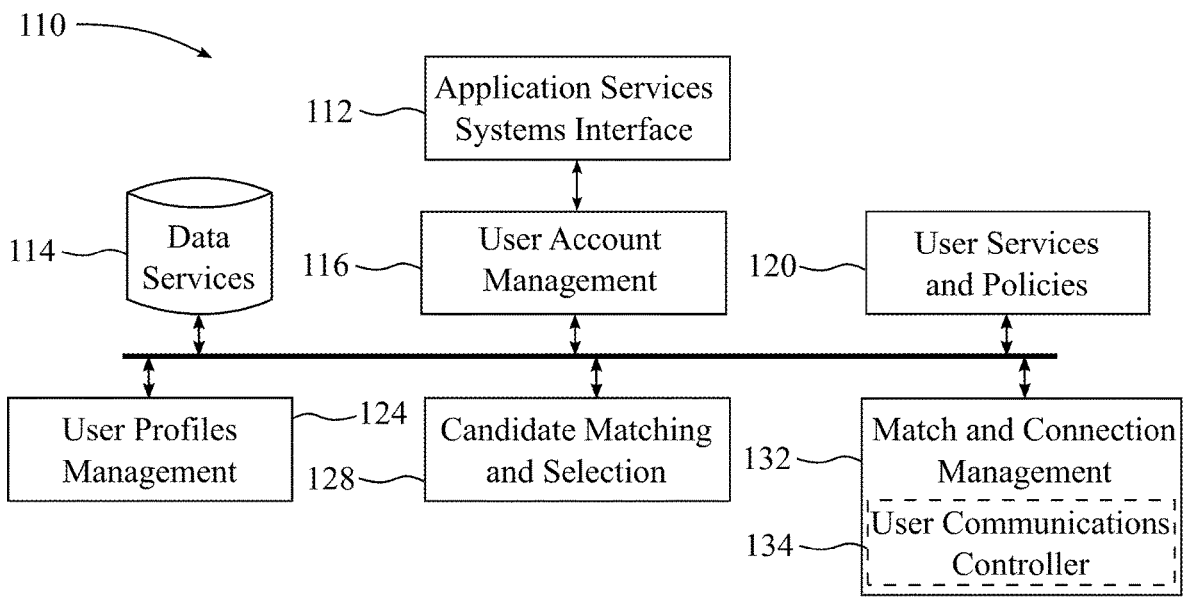
FIG. 1B is a block diagram of an example implementation of an application services system of the connection system of FIG. 1A.

FIG. 1B is a block diagram of an example implementation of an application services system 110 of connection system 100 of FIG. 1A, and illustrates functions and services of system 110 organized into application software modules and data services accessible via a communications interface module. FIG. 1B depicts one of many possible ways to organize application software into various software modules and data services, and may reside on one or more servers, devices, cloud-based systems or a combination thereof. In some implementations, application services system 110 may comprise an application services systems interface 112, such as an application programming interface (API) or application services interface module, data services 114, a user account management module 116, a user services and policies module 120, a user profiles management module 124, a candidate matching and selection module 128 and a match and connection management module 132, wherein applications services systems interface 112, data services 114 and modules 116, 120, 124, 128 and 132 may operate on one or more servers (not shown in FIG. 2) and/or may operate on a cloud-based system (not shown in FIG. 2). As shown in FIG. 1B, in some implementations match and connection management module 132 may comprise a user communications controller 134 which may control and/or host communications and/or control a host of communications to facilitate communications between users, such as qualifying video chats between matched users, controlled communications between matched users regarding a video chat, ongoing communications between connected users and the like. Also referring to FIG. 1A, using a user device, such as smartphone 140, tablet 150 or computer 160, a user may connect to application services systems interface 112 of application services system 110 over network 170 and communications links 171, 174, 175 and 176, and interact with user account management module 116. User account management module 116 may provide for management and control of a plurality of user accounts. A user may enroll and create a user account within connection system 100 and interact with their user account by so accessing user account management module 116. User account management module 116 may operate in conjunction with data services 114 to maintain data associated with a plurality of user accounts.

User Account Management

In some implementations, when enrolling in connection system 100, a user may access user account management module 116 to create a user account and establish login credentials which may then be used for ongoing secure access to their user account. In some implementations, user account management module 116 may be configured to additionally or alternatively be responsive to a third party authentication service for secure user login, wherein a user may establish login capability by logging in through a third party service such as logging in through a Google account, a Facebook account or other third party service providing such authentication services. In some implementations, use of such third party authentication services may provide access to certain data and information associated with a user and comprised by the third party service, such as for example, possible access to a user's one or more email addresses, the user's birthday, the user's gender, user photos, user videos, user social contacts and other data and information associated with the user which, when accessed by the connection system 100, may reduce the amount of data and information requiring entry by the user when creating or updating a user account. Additionally, the user may avoid the need to create and remember an additional set of login credentials required for logging into connection service 100. In some implementations the login process may include an additional, one or more, authentication steps, such as in two-factor authentication or multi-factor authentication, wherein an additional one or more authentication steps beyond a submitting of a username and password are required to complete the account login process. Such additional authentication steps could comprise the sending of a single or limited use code via one or more communication methods comprising emailing, text messaging, such as an SMS messaging, and voice messaging wherein the single or limited use code must be entered as an additional step in the login process. Such additional authentication steps could alternatively, or additionally, comprise biometric measures such as a fingerprint reading or facial image reading of a user, wherein the reading is accomplished in conjunction with a user device, and the result of the reading may then be compared with a prior reading stored within data services 114 to authenticate an entity attempting to login and thereby make a determination whether to grant login and access to a user account comprised by system 100.

User Profiles Management

In some implementations user account management module 116 may further manage user interaction with user profiles management module 124 wherein a new user may create a user profile associated with their user account and an existing user may edit a previously created and stored user profile comprised by data services 114. A user profile may comprise images of the user and other information related to the user, such as the user's age, primary location, general location, current location, favorite song, favorite musician, favorite genre of music, favorite movie, favorite genre of movie, favorite TV show, favorite actor/actress, favorite book, favorite author, favorite restaurant, favorite cuisine, favorite travel destination, hobbies, interests, and the like. In some implementations, user profiles may comprise numerous details about users, and in some implementations user profiles may be limited in the amount of details. In some implementations, user profiles may be created or updated, at least in part, by connection system 100 accessing user information comprised by a third party system, such as social networking system, wherein such access is available with the associated user's provision of necessary permissions for such access. In some implementations, the third party system may be provisioned as a third party authentication service for user login to the connection system, wherein the third party authentication service provides such access to usable information related to the user. In such implementations where system 100 accesses third party information to at least in part create or update user profiles, the user may review, edit and complete information as necessary in addition to connection system 100 populating user profile information retrieved from third party systems.

Candidate Matching and Selection

Users may receive candidate matches comprising the user profiles of other users, or portions thereof, which are of potential interest and make determinations of their further interest, or lack thereof, in the users associated with each of the received candidate matches. A user associated with a received candidate match may be referred to as a candidate match user. A user receiving a candidate match may be referred to as a receiving user. User account management module 116 may receive from a user a user request to receive candidate matches of other users represented by their user profiles, or portions thereof, within connection system 100. In order to receive candidate matches of potential interest, users may specify filtering, selecting and matching criteria, such as for example, age, range of age, gender, location, range of proximity to a location, interests, hobbies, and the like, wherein such criteria may be called match settings and be used to filter a pool of match candidates from the overall population of user profiles comprised by data services 114 and connection system 100. In some implementations, user account management module 116 manages interaction with candidate matching and selection module 128 such that a user may specify such match settings, where the match settings may be associated with their user account and/or user profile and stored for later retrieval in data services 114 for use when a user submits a request for candidate matches to select a pool of candidate matches meeting, at least in part, match settings specified by the user. In some implementations, a user may specify match setting in conjunction with a request for candidate matches. The user may then consider user profiles from the pool of candidate matches and provide a positive match interest indication or a negative match interest indication regarding their interest in each of the candidate matches they consider, thereby providing a positive interest indication for those candidate matches within the pool of received candidate matches with which they have interest in exploring a connection. In some implementations, during the process of specifying match settings, the user may be presented with an indication of the size of the pool of candidate matches that are at least in part associated with the match settings. Such an indication may be indicated in exact or approximate numbers or ranges of numbers, or be expressed in general terms indicating an issue of too many to practically be reviewed and considered, or too few match candidates indicating little to none to review and consider, with guidance to increase or reduce the specificity of match settings (filter criteria) to accordingly attempt to correct the issue. In some implementations, the pool of match candidates may be prioritized for presentation to the user in an order representing, at least in part, a degree of correlation between the candidate match profiles and the user match settings. In some implementations, the order of presentation to the user may be an order in which the candidate matches were retrieved. In some implementations other criteria may be used to order the candidate matches for presentation, such as, recent match activity associated with the candidate match, recent match activity of the requesting user with candidate matches of similar or specific criteria correlation, candidate match length of time in the connection system, candidate match length of time since last match or qualified connection, etc. Two users of connection system 100 may request, consider and provide match interest indications in candidate matches, such that they each receive the other user's user profile, and indicate a positive match interest in the other user, thereby resulting in mutual positive match interest indications, wherein the latter occurring of the two may be referred to as a reciprocal positive match interest indication. Upon a reciprocal positive match interest indication, a match is created between the two users having indicated mutual positive match interest indications in each other and thereby expressing interest in exploring a connection therebetween.

Match and Connection Management

In some implementations, after a match is created, the next interaction between the two users of the match is required to be through a qualifying video chat, or in regards thereto, such as the initiation or scheduling of the qualifying video chat. As such, in some implementations a limited communication between the two users regarding the initiation or scheduling of the qualifying video chat may be facilitated. User account management module 116, may manage user interaction with match and connection management 132, which may comprise a user communication controller 134, and may collectively facilitate a controlled communication between a pair of users having expressed mutual positive match interest indications and thereby creating a match therebetween. Such controlled communication may comprise a qualifying video chat, wherein the two users attempt to successfully complete a qualifying video chat, wherein a successfully completed qualifying video chat may be referred to as a qualified video chat, and an unsuccessful qualifying video chat may be referred to as a failed video chat. In some implementations, there may be a requirement to video chat within a chat time window, wherein a time window may commence at a time in relation to the creation of a match, such as the time a match is created. In some implementations, if a video chat time window requirement is not met, then the match may expire or may be otherwise inactivated upon the expiration of the chat time window. In some implementations, there may be a requirement for a qualifying video chat time duration to exceed a minimum qualification time, thereby satisfying a qualification requirement, for the qualifying video chat to be determined as successful and become a qualified video chat, and those not meeting the minimum qualification time may thus be determined to be failed video chats. In some implementations, the requirement to be satisfied for a qualified video chat may be that each user engaged in a qualifying video chat indicate that the video chat meets their approval for a qualified video chat. In some implementations, a facilitation of controlled communication may include a plurality of facilitating functions which may be provided by match and connection management module 132 and in part by user communication controller 134, such as, notifications and review capabilities by users of their matches, management of match expirations with respect to their respective chat time windows, scheduling and review capabilities by users of their scheduled video chats, hosting of, or controlling a host of, the video chats and determinations of success or failure of meeting qualification requirements of qualifying video chats.

In some embodiments, communication regarding scheduling of video chats may be restricted by match and connection management module 132 and in part by user communication controller 134, to preset phrases and calendar/day/time selections in order to limit and control what may be communicated between matched users. In some implementations upon a reciprocal positive match interest indication resulting in a match, a prompt may be displayed on a user device to immediately attempt a qualifying video chat and/or to attempt to schedule a qualifying video chat, and be displayed in conjunction with the notice that the match has been created. In some implementations a match notification may be additionally sent to the other user of the pair of matched users informing the other user that the match has been created, and may additionally prompt the other user to immediately attempt a qualifying video chat and/or to attempt to schedule a qualifying video chat. In some implementations users may check to see all pending matches within their account, review if and when a qualifying video chat is scheduled and determine if any matches are at risk of expiration due to an expiring chat time window. For example, a list of one or more matches which may be pending may be displayed in a scrollable list on a user device, each match including, for example, a "head shot" image and a user name, both as may be associated with a user profile of the matched user, an indicator of time remaining prior to an expiration of a chat time window associated with the match, and an indication of a scheduling status regarding a qualifying video chat associated with the match. In some implementations, one or more matches may be shown with an indication of current availability status of the matched user, such as for example, a green indicator bordering an image of the matched user to indicate the matched user may be presently available for a video chat, a yellow border to indicate the matched user may be presently busy or no border to indicate an unknown availability status. In some implementations, a user may indicate their current availability through a setting within their account comprised by system 100 which may then be shown to other users with which they are currently matched. In some implementations a limit on the number of new matches which may be acquired over a period of time, day, number of days or the like, may be imposed. In some implementations a limit of currently active matches, wherein active match means not yet expired or converted to a qualified connection, may be imposed.

As noted, match and connection management module 132 and user communication controller 134 may facilitate controlled communication comprising the required qualifying video chat and the associated qualification process. In some implementations, facilitation of controlled communication may include additional functions, such as video chat rescheduling, video chat reattempts, video chat time window extension requests, upcoming scheduled video chat alerts, and tests and warnings for poor communications connections associated with an impending or recently initiated video chat. As such, in some implementations users may attempt to reschedule a pending qualifying video chat. Furthermore, match and connection management 132 and user communication controller 134 may facilitate a video chat between two users comprising a match by providing alerts and reminders to users when scheduled video chats are imminent. Additionally, in some implementations the wireless connection signal strength and quality may be assessed in advance of the video chat to determine if it is sufficient to provide an effective video chat of sufficient anticipated quality. If not, the user may then take action to improve the connection prior to the video chat, such as, move to a location with better reception or switch from a WAN to a wireless LAN connection or vice versa, or attempt to reschedule the video chat until a better connection may be available. In some implementations, upon completion of a successful qualifying video chat, namely, a qualified video chat, each of the two users may provide a second interest indication (the first interest indication being a match interest indication) regarding the other user, wherein the second interest indication may be a positive connection interest indication or a negative connection interest indication regarding their interest in ongoing communication with the other user. If there is mutual positive interest thereby resulting in mutual positive connection interest indications, wherein the latter occurring of the two may be referred to as a reciprocal positive connection interest indication, a connection may be created between the two users and further communication may be enabled wherein match and connection management module 132 and user communication controller 134, enable the two connected users to communicate with each other in an ongoing fashion.

User Services and Policies

User account management module 116 may manage user interaction with user services and policies module 120 and thereby may allow users of connection system 100 to request and/or access user assistance and other support services, such as to ask questions regarding system functionality and services, and to access and report policy rules and concerns. In some embodiments, user services and policies module 120 may also allow users to report policy infractions and other concerning behavior of other users such that a user based policing procedure may be supported. For example, in some implementations, users may be automatically blocked from use upon a given number, such as three, reports being submitted regarding their policy infractions or concerning behavior. A blocked user may then have to successfully appeal to be reinstated to use of the system.

Data Services

Data services 114 may provide data storage and access thereto for data in one or more databases, such as for example, user account data, user profile data, user interest indication data, match data, video chat data, scheduling data, time window data, connection data, user policy data, user services data and the like.

User Devices

Figure 1C:
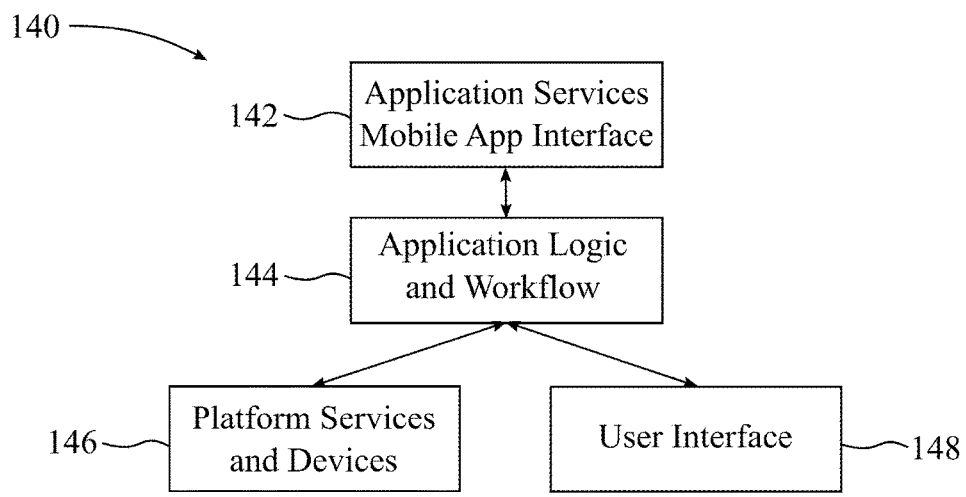
FIG. 1C is a block diagram of an example implementation of a smartphone device usable with the connection system of FIG. 1A.

FIG. 1C depicts a block diagram of an example implementation and of a smartphone device 140 usable with connection system 100 of FIG. 1A. Smartphone device 140 may comprise an application services mobile app interface 142, application logic and workflow 144, platform services and devices 146 and a user interface 148. FIG. 1C depicts one of many possible ways to organize and represent interfaces, software, services and devices that may reside on a user device such as smartphone 140. Also referring to FIG. 1A and FIG. 1B, application logic and workflow 144 may provide for management and control of user interaction with a user's smartphone device 140 and a user's user account comprised by connection system 100 via applications services mobile app interface 142 which may be connected to application services systems interface 112 of application services system 110 over network 170 and communication links 174 and 171. Un some implementations, application logic and workflow 144 may control user interface 148 to display information, such as for example, a user account status, a menu of available user operations, candidate matches, matches, pending video chats, communications and the like. Application logic and workflow 144 may receive user input from user interface 148, such as for example, a user selection from a menu of available user operations, a user match interest indication regarding a candidate match, a user request for a video chat with a match, a user connection interest indication regarding a match after a qualified video chat therewith and the like. Application logic and workflow 144 may access platform services and devices 146 to interact with a plurality of platform services and devices 146 of smartphone device 140, such as, cameras, audio speakers/headphones, geo location services, sensors, computing resources, data storage and access resources, device communications, user text communications, user voice communications, user video communications and the like. While FIG. 1C is illustrated and discussed in conjunction with smartphone device 140, various user devices capable of real time video chat communication by a device user, and communication over communication network 170 and communication links 174, 175 and 176 may be used to interact with connection system 100, such as smartphones 140, tablets 150 and computers 160.

Figure 1D:
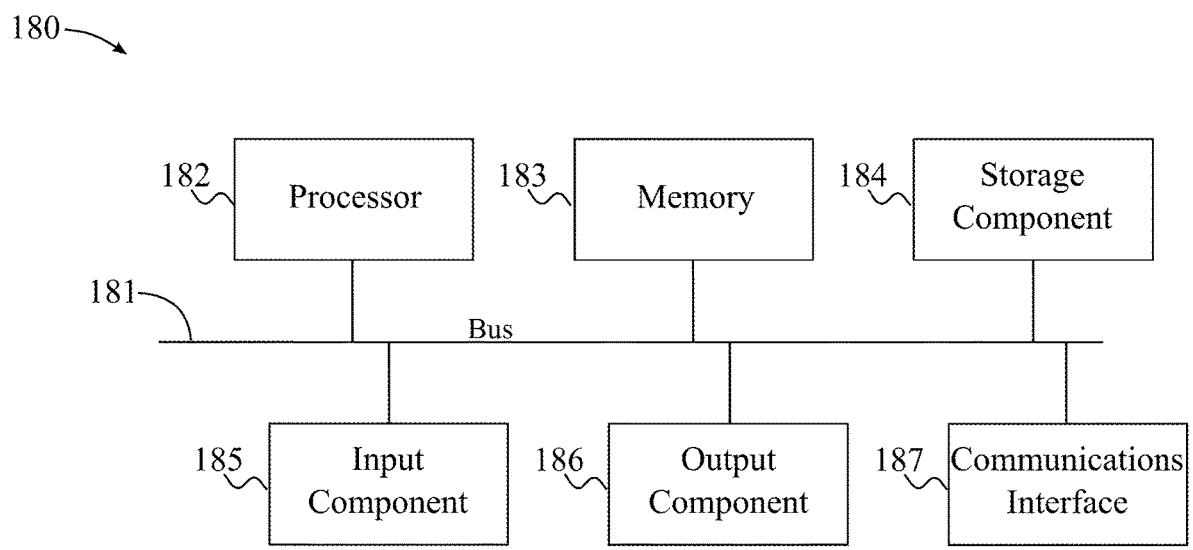
FIG. 1D is a diagram of example components of a device comprised by or usable with the connection system of FIG. 1A.

FIG. 1D is an example illustration depicting a diagram of example components of a device 180, wherein the device may correspond to various user devices, such as user devices 140, 150 and 160 discussed above which enable users to interact with application services system 110. Device 180 may correspond to one or more devices comprised by application services system 110, such as one or more servers thereof and may correspond to one or more devices comprised by a cloud-based system potentially comprising application services system 110 and potentially comprising application services system 110 in part. In some implementations, application services system 110 and user devices 140, 150 and 160 may include one or more devices 180 and/or one or more components of device 180.

Bus 181 includes a component that permits communication among the components of device 180. Processor 182 may be implemented in hardware, firmware, or a combination of hardware and firmware. Processor 182 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 182 includes one or more processors capable of being programmed to perform a function. Memory 183 includes a random access memory (RAM), a read only memory (ROM), and/or another type of dynamic or static storage device (e.g., a flash memory, a magnetic memory, and/or an optical memory) that stores information and/or instructions for use by processor 182.

Storage component 184 stores information and/or software related to the operation and use of device 180. For example, storage component 184 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 185 includes a component that permits device 180 to receive information, such as via user input (e.g., a touch screen display, a keyboard, a keypad, a mouse, a button, a switch, and/or a microphone). Additionally, or alternatively, input component 185 may include a sensor for sensing information (e.g., a global positioning system (GPS) component, an accelerometer, a gyroscope, and/or an actuator). Output component 186 includes a component that provides output information from device 180 (e.g., a display, a speaker, and/or one or more light-emitting diodes (LEDs)).

Communication interface 187 includes a transceiver-like component (e.g., a transceiver and/or a separate receiver and transmitter) that enables device 180 to communicate with other devices, such as via a wired connection, a wireless connection, or a combination of wired and wireless connections. Communication interface 187 may permit device 180 to receive information from another device and/or provide information to another device. For example, communication interface 187 may include an Ethernet interface, an optical interface, a coaxial interface, an infrared interface, a radio frequency (RF) interface, a universal serial bus (USB) interface, a Wi-Fi interface, a cellular network interface, or the like.

Device 180 may perform one or more processes described herein. Device 180 may perform these processes in response to processor 182 executing software instructions stored by a non-transitory computer-readable medium, such as memory 183 and/or storage component 184. A computer-readable medium is defined herein as a non-transitory memory device. A memory device includes memory space within a single physical storage device or memory space spread across multiple physical storage devices. In some implementations, a memory device may be cloud-based, partially cloud-based, or not cloud-based.

Software instructions may be read into memory 183 and/or storage component 184 from another computer-readable medium or from another device via communication interface 187. When executed, software instructions stored in memory 183 and/or storage component 184 may cause processor 182 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 1D are provided as an example. In practice, device 180 may include additional components, fewer components, different components, or differently arranged components than those shown in FIG. 1D. Additionally, or alternatively, a set of components (e.g., one or more components) of device 180 may perform one or more functions described as being performed by another set of components of device 180.

Match and Connection Process Flow

Figure 2:
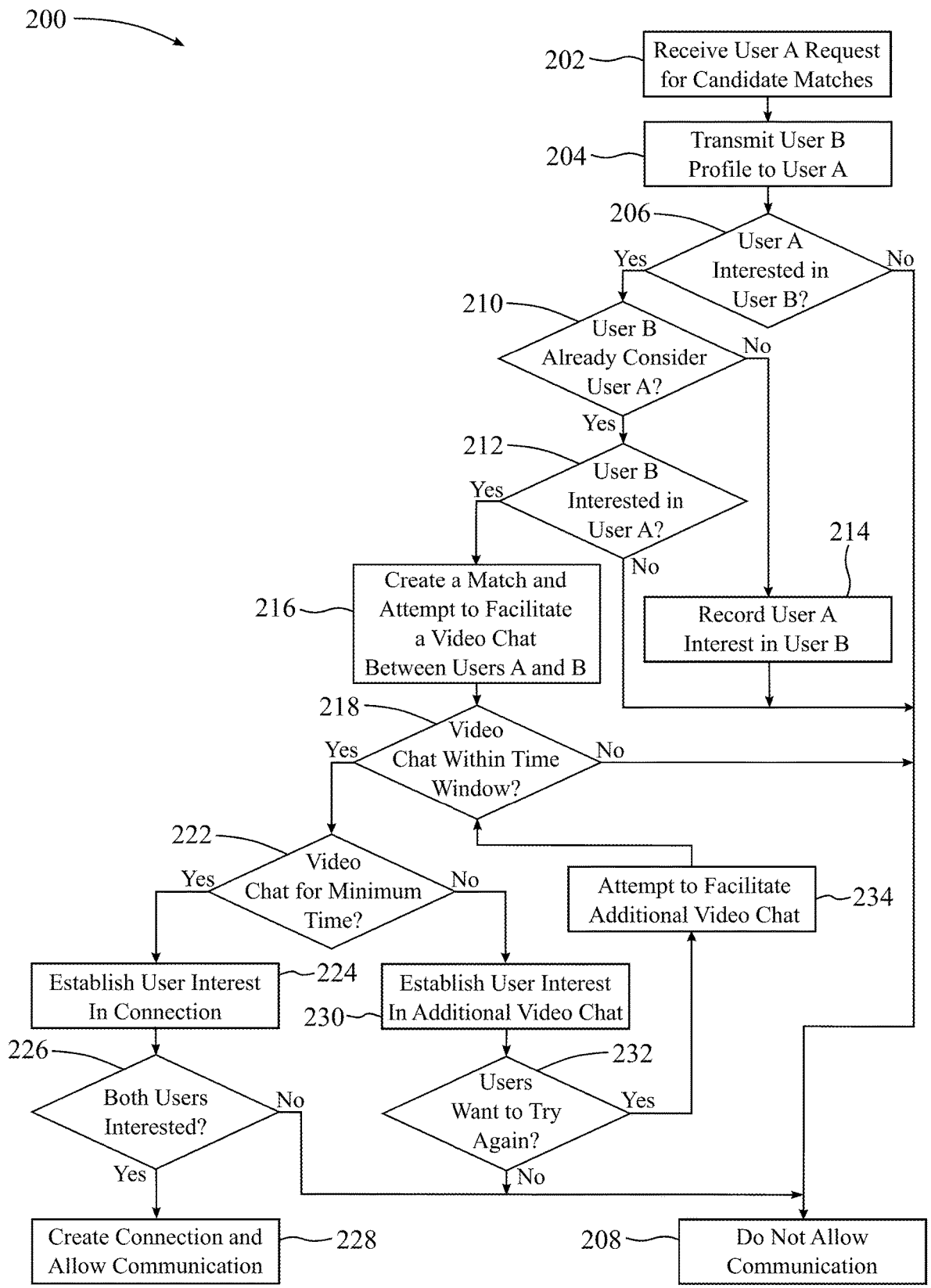
FIG. 2 is a flow diagram of an example process implementation of the connection system of FIG. 1A.

Referring to FIG. 2, a flow diagram of an example connection process 200 implementation of connection system 100 of FIG. 1A is shown, wherein process 200 facilitates communication between two users, User A and User B, and may establish a connection therebetween. In the example implementation depicted, process 200 may be initiated when a candidate match request from a user, such as User A, is received in step 202. Also referring to FIG. 1A, FIG. 1B and FIG. 1C, the candidate match request may originate from User A in operation of a user device such as a smartphone 140, a tablet 150 or a computer 160 and be received by application services system 110. For purposes of this illustrative discussion, process 200 will be further described with the example of User A using a smartphone 140. In some implementations, a candidate match request may be indicated and initiated by User A as a menu selection using user interface 148 and processed by application logic and workflow 144, which then sends the candidate match request to application service systems interface 112 of application services system 110 via application services mobile app interface 142 over communications network 170 and communications links 174 and 171, wherein ongoing system interaction between smartphone 140 and application services system 110 may similarly occur through systems interface 112 and mobile app interface 142. In some implementations, a candidate match request may include filtering criteria, also referred to as match settings, about candidate matches as specified by User A. The match settings may include geographical location (e.g., within 1 mile of User A's location, etc.), gender, age, and the like. In some implementations, a candidate request may not include match settings and such match settings may have been previously stored in data services 114 and associated with a user account of User A and are accessible by application services system 110 which has received the candidate match request in step 202.

Generally, a pool, e.g. a set, of candidate matches consistent, at least in part, with the match settings may then be generated. A pool of candidate matches may be generated by candidate matching and selection module 128 from a larger group of user profiles stored in and accessible from data services 114 within application services system 110 which received User A's request for candidate matches. Candidate matching and selection module 128 may determine a set of candidate matches which match, at least is part, match settings as specified by User A from data services 114 and send one or more candidate matches (assuming in this example that the set comprises at least one) to the user smartphone device 140 via user account management module 116 and systems interface 112, mobile app interface 142, communication network 170 and communications links 171 and 174 as previously described regarding such ongoing user interaction with application services system 110. As illustrated by example process 200, after receipt of User A's request at step 202, a profile of a candidate match User B, such that the profile of User B matches, at least in part, the match settings specified by User A, may be retrieved and transmitted to User A at step 204. User A is given the ability to review and consider the User B profile on user interface 148 and decide if they have interest in further communication with User B. This decision occurs at step 206. Such interest may be indicated in a number of ways. For example, in this example implementation, User A is communicating via a smartphone device 140 comprising a touch screen, and User A may indicate interest in a number of potential ways depending on various possible implementations, such as, by performing a swiping gesture on the touch screen, tapping a set amount of times on the touch screen, or touching a specific portion of the touch screen. If User A indicates a negative match interest indication, namely, that they are not interested in further communication with User B, no communication is allowed in step 208.

If in step 206 User A indicates a positive match interest indication, namely, an interest in further communication with User B, a system generated query is then made in step 210 to determine if User B has already considered User A, such that User B has already made a similar request for candidate matches, received User A's profile as a candidate match in response and provided an indication if they have or do not have interest in further communication with User A. The system query may be generated upon application logic and workflow 144 communicating User A's positive match interest indication in User B to application services system 110 via application services mobile app interface 142, communication network 170, communication links 174 and 171, to application services systems interface 112 of application services system 110 as previously described regarding such ongoing system interaction. If User B has not yet considered User A then User A's interest in User B is recorded in step 214 and the process flows to step 208 where no communication is allowed between User A and User B, since User B has yet to consider User A and has not indicated a positive match interest indication therein. Should User B indicate such interest at a later time, a match would then be created according to the resulting reciprocal positive match interest indication between User A and User B.

If User B has already considered User A in step 210, the process continues to step 212 where if User B indicated negative interest in further communication with User A the process proceeds to step 208 where no communication between User A and User B is allowed. If in step 212 User B has already indicated positive interest in further communication with User A resulting in a reciprocal positive match interest indication by User A in step 206, then the process may create a match between User A and User B and attempt to facilitate a video chat therebetween in step 216. In some implementations, user account management module 116 and candidate matching and selection module 128 may record the match between User A and User B in data services 114, and communicate the match to User A's smartphone device 140 for display on user interface 148. In some implementations, there may be a requirement to video chat within a chat time window associated with the creation of a match, wherein if the video chat time window requirement is not met in step 218, then the process proceed to step 208 and further communication is not enabled. In some implementations, the match may expire or may be otherwise inactivated upon the expiration of the chat time window. In some implementations, after a match is created in step 216, a next interaction between User A and User B is required to be through a qualifying video chat, or in regards thereto, such as the initiation or scheduling of the qualifying video chat. In some implementations a limited communication between User A and User B regarding initiating or scheduling of the qualifying video chat may be facilitated. In some implementations a prompt may be displayed on user interface 148 to User A to immediately attempt a qualifying video chat and/or to attempt to schedule a qualifying video chat in conjunction with the notice that the match with User B has been created. In some implementations a notification may be similarly sent to User B notifying User B that the match has been created with User A, and may similarly prompt User B to immediately attempt a qualifying video chat and/or to attempt to schedule a qualifying video chat. In some implementations User A and User B may check to see all pending matches within their accounts, and review if and when a qualifying video chat is scheduled. In some implementations User A and User B may attempt to reschedule a pending qualifying video chat.

In example process 200 implementation, User A and User B may independently receive each the other's user profile. In some implementations, a user's indication of positive interest in a candidate match may be an express positive match interest indication and initiate a sending of the indicating user's profile for express presentation to, and consideration by, the candidate match. For example, following User A's indication of an express positive interest in User B in step 206 and then after determining in step 210 that User B has not already considered User A, User A's profile may be sent to User B, wherein the next time User B interacts with connection system 100, User B may consider User A's profile and indicate whether or not they are interested in further communication with User A. In such an implementation, step 214 may comprise both a recording of User A's interest in User B and a sending of User A's profile to User B for consideration. When not considering this potential process flow where User B may be sent User A's profile in response to User A indicating an express positive match interest indication in User B, steps 210 and 212 may potentially be implemented as one step wherein a prior indication of User B's positive match interest indication directs the process to step 216 where a match is created, and no such prior indication of positive interest, meaning either User B has not yet considered User A or User B has considered User A and indicated negative interest, the process proceeds to step 214 where User A's interest is noted and then to step 208 where communication between User A and User B is not allowed.

As noted earlier, in some implementations there may be a requirement to video chat within a chat time window associated with the creation of a match. This is shown in step 218, where if the video chat has not occurred within the chat time window, the process proceeds to step 208 and communication is not allowed. In some implementations, the two users are not required to initiate a video chat within a chat time window (i.e., step 218 simply waits for the two users to engage in a video chat). In some implementations, the later receipt of positive interest from either User A or User B begins the time period (i.e., begins the chat time window) to video chat with one another. User A and User B may be required to video chat within an amount of time that is more than 5 minutes or more than 10 minutes or more than 30 minutes or more than 1 hour or more than 5 hours or more than 1 day or more than 2 days or more than 1 week upon receipt of both users' positive interest. In some implementations, User A and User B are required to video chat within three days of receipt of both users' positive interest. FIG. 2 depicts this process in step 218. In some implementations, if the users are unable to video chat with one another within the time period (i.e., chat time window), they each may be offered an ability to try to video chat with one another again. In some implementations, each user may again be offered a chance to video chat one or more than one (e.g., two, three, four, five, six, ten, etc.) times. In such implementations where the users are unable to video chat with one another within the time period and are offered a subsequent chance, a new chat time window may be established and the process may return to step 216 where an attempt to facilitate a video chat is reattempted.

In some implementations, in order for a connection to be possible, it is required that User A and User B engage in a qualifying video chat and a qualification requirements of a qualifying video chat be met, such as, a time duration of the qualifying video chat must exceed a minimum required video chat qualification time. If User A and User B have satisfied a requirement to video chat within the chat time window in step 218 (or in the implementation where step 218 simply waits for the two users to engage in a video chat), the process proceeds to step 222 where in some implementations, a check is made to see if a time duration of the qualifying video chat meets a minimum video chat time required for qualification in order for a video chat to be a qualified video chat. In some implementations, the requirement to be satisfied for a qualified video chat may be that each user engaged in a qualifying video chat indicate that the video chat meets their approval for a qualified video chat. The video chat between User A and User B may occur with each user operating a user device, such as, smartphone 140, tablet 150 or computer 160 having the requisite camera, microphone, audio device (or voice to text may alternatively be employed for hearing challenged users), display, and communication capability required to transmit and receive video from the other user. In some implementations, each user's device may be independently selected from a smartphone, a tablet, a personal computer, a gaming console, or a laptop. In some implementations, the video stream communications, namely, the video chats, may be controlled by communications controller 134 of match and connection management module 132 of application services system 110. For example, user communications controller 134 may control video streams of a video chat exchanged between two user devices using a communications signaling protocol, such as Session Initiation Protocol (SIP) as described in part in RFC 3261, July 2002, wherein the two user devices are direct endpoints for each video stream (namely, a stream to and a stream from each user device). In some implementations, user communications control 134 may alternatively or additionally host and relay video streams of a video chat (effectively transmitted through the host) exchanged between to user devices. In some implementations, user communications controller 134 when hosting (relaying) may further be configured to record relayed video streams (i.e., record video chats). In some implementations another remote device may provide for a controlled video chat communication under control by user communication controller 134 of match and connection management module 132 of application services system 110 and may be employed as an additional service or an alternative video chat communication service. As used herein, a remote device that may provide for a controlled video chat communication under control by user communications controller 134 of match and connection management module 132 of application services system 110 is any remote host which may provide a video chat between User A and User B in a controlled manner and under the control of application services system 100.

In some implementations, the time duration of the video chat may be used to determine if it is a qualified video chat and a connection and further communication between User A and User B is possible. In FIG. 2, this is illustrated in step 222. If the users do not video chat for a required minimum amount of time they may be offered the ability to try to video chat again at step 232, following an indication of such interest in step 230. As such, in some implementations, when the video chat does not meet a minimum length (e.g., more than a minute, more than five minutes, more than 10 minutes, etc.), each user will be facilitated with the opportunity to attempt a reattempt video chat, as depicted in step 234. In some implementations the second and subsequent video chat requirement is the same amount of video chat time as required for the first video chat requirement. In some implementations, each user may be allowed to set their own amount of required time for video chat. Such allowance may be offered at step 230 and/or step 234. Additionally or alternatively, in some implementations, the match settings may comprise a required and/or suggested length of video chat time for which to screen or filter the pool of candidate matches. In some implementations, further communication (including SMS text messages, voice calls, emails, video chat, etc.) will not be permitted between User A and User B until the minimum time for video chat is met (e.g., a set time of 5 minutes, a set time of 10 minutes, the longest time set by User A or User B, etc.). This step of not permitting further communication is illustrated in FIG. 2 as step 208. In some implementations, the minimum time for video chat is between 1 minute and 15 minutes (e.g., between 3 minutes and 10 minutes, between 4 minutes and 6 minutes, 5 minutes, 10 minutes, etc.). In some implementations, users are not allowed further communication until the minimum time for video chat is met or exceeded by the combined total amount of video chat time durations of discrete video chats between users and may include interrupted video chats. In certain implementations, the users are not allowed further communication until the minimum time for video chat is met or exceeded by the time duration of a single of video chat (i.e., interrupted, discrete video chats between users). The user's display, such as that of user interface 148, displaying the video chat for each user may comprise a timer displaying a time length of the video chat overlaid over a portion of the video being displayed to each user. In some implementations, the display timer may change to indicate that the required length of the video chat has been met. In certain implementations, the display timer changes from one color (e.g., red, etc.) to another color (e.g., green, etc.) once the minimum time for video chat has occurred.

Upon completion of a successful qualifying video chat, namely, a qualified video chat, each of the two users may provide a second interest indication in step 224 regarding the other user, wherein the second interest indication may be a positive connection interest indication or a negative connection interest indication regarding their interest in establishing a connection enabling ongoing communication with the other user. If in step 226 one or both express a negative interest, the process proceeds to step 208 where communication is not allowed. If in step 226 there is mutual positive interest thereby resulting in mutual positive connection interest indications, a qualified connection is created between the two users wherein they are enabled to communicate with each other in an ongoing fashion in step 228.

Enhanced Services, Pay-Per-Use Services and Paid Subscription Based Services

In the foregoing disclosure, implementations a connection system and method may comprise and facilitate a process of matching users and a subsequent process of connecting users through qualifying video chats. Referring again to FIG. 1B, in various implementations, a connection system may offer various enhanced services, wherein candidate matching and selection module 128 may comprise enhanced candidate matching services; match and connection management module 132 may comprise enhanced match and connection management services which may comprise enhanced scheduling services and enhanced video chat services; and user services and policies module 120 may comprise enhanced user services and policies, wherein user services may comprise user coaching services and user policies may comprise advanced policy enforcement features. Enhanced video chat services may comprise enhanced qualifying video chat services and additional video chat services, such as group video chat services provided as social interaction events.

In some implementations, a connection system may generate revenue through sales of advertising presented to users of the connection system. In some implementations a connection system may alternatively or additionally generate revenue through services provided to and paid for by users of the connection system on a per use basis and/or a limited time basis. In some implementations, a connection system may alternatively or additionally generate revenue by users subscribing to a paid subscription to the connection system, such as a premium services subscription, wherein users are motivated to subscribe by services they may desire which are otherwise provided only to users on a paid per use basis or through such a paid subscription. When a particular service may be desirable to a large population of users, yet carries additional system overhead and costs, offering the service as a pay-per-use feature allows an operator of a connection system to potentially generate additional revenues and to potentially cover costs associated with the use of the service. Grouping a set of services that are not mandatory to use the connection service, but are desirable to a set of users, may be offered as part of a subscription service, thereby allowing an operator of the connection system to potentially generate additional revenues and to potentially cover costs associated with the use of the set of services. An operator of a connection system may determine that various subscription packages comprising differing services and potentially offered at different prices may influence a higher subscription rate and/or higher subscription revenues. In an implementation, subscription packages may also be offered as a way for users to use the connection system free of advertisements or with fewer advertisements in lieu of subscription fees paid for use of the system. An operator of a connection service may determine that making some enhanced services part of a basic free offering may encourage a higher level of enrollment and use such that overall revenues are increased. Additionally, an operator of a connection service may choose to make some enhanced services available solely on a pay-per-use basis. While various enhanced services of various implementations disclosed in the following discussion may be described in terms of pay-per-use access and/or subscription based access, they may alternatively be offered in implementations wherein they are offered as part of a basic free connection service offering. Table 1 below is an example implementation depicting how four features/services may be made available across three example plans (no subscription and tier 1 and tier 2 subscription plans), and on a pay-per-use basis. Advertising is also shown in table 1.

TABLE 1

Example Implementation of Feature and Service Availability Including Advertising

| Feature/ Service | Basic System/ No Subscription | Tier 1 Subscription | Tier 2 Subscription | Pay-Per-Use |
|---|---|---|---|---|
| Feature/ Service 01 | One Incident Per Day Included | Five Incidents Per Day Included | Ten Incidents Per Day Included | Five Additional Incidents Per Day for Fee |
| Feature/ Service 02 | Not Included | Included | Included | Available for Fee |
| Feature/ Service 03 | Not Included | Not Included | Included | Not Available for Fee |
| Feature/ Service 04 | Not Included | Not Included | Not Included | Available for Fee |
| Advertising | Included | Included | Not Included | Depends on Subscription |

In table 1, the availability of feature/service 02 and feature/service 03 vary based on a user's subscription plan with the connection system. Feature/service 01, feature/service 02 and feature/service 04 are available for a usage fee on a pay-per-use basis. The basic service/no subscription plan has the fewest included features; the higher level tier 2 subscription plan has the most included features; and the tier 1 subscription plan has an intermediate number of included features. Tier 2 does not have advertising, whereas tier 1 does. A quantity of a feature/service, such as a number, time period or both, may be included per the type of plan, as shown for feature/service 01, wherein a pay-per-use availability may enable a user to purchase an additional quantity.

FIG. 3A is an example implementation of a user purchases table which may be comprised in a database accessed by data services 114 of FIG. 1B. User purchases table 300 comprises records related to user purchases such as pay-per-use features and services and subscription services available for purchase within a connection system. In the example implementation of user purchases table 300, table 300 comprises records relating to user purchases, wherein a record may comprises a user purchase ID 302 identifying a user purchase, a user ID 304 identifying the user making the purchase, a transaction ID 306 identifying a payment transaction recording details thereof for the purchase, a feature/service ID 308 identifying the feature/service purchased, a feature/service quantity 310 purchased which units may vary based on the feature/service purchased (e.g., number of feature/services, number of hours, etc.), and if the purchase is related to a match or connection the user has with another user, the match or connection may be identified in a match and connection ID 312, which may refer to a match and connection record as will now be described herein.

Enhanced Candidate Matching and Selection Services

FIG. 3B is an example implementation of a match and connection table 320 which may be comprised in a database accessed by data services 114 of FIG. 1B. Match and connection table 320 comprises records related to potential matches, matches and connections between users. A record may be created in match and connection table 320 upon a user providing an interest indication in a candidate match user. A match and connection record of table 320 may comprise: a match and connection ID 322, which identifies the match and connection record; a first user ID 324 associated with and identifying a user providing an interest indication in a candidate match user; a second user ID 326 associated with and identifying the candidate match user; a match and connection status 328 representing a status of the match and connection record, such as a pending status, a matched status, a connected status, etc.; a match window 330 for a qualifying video chat, which may be represented as a date/time when a chat time window may expire; a first user match interest 332 which may indicate a match interest (positive or negative) indicated by a first user ID 324 regarding a second user ID 326, and in some implementations may further indicate a positive interest comprising an express presentation request for a presentation of their information to, and express interest in, the second user; a second user match interest 334 which may indicate a match interest (positive or negative) indicated by a second user ID 326 regarding a first user ID 324, and may be a reciprocal positive match interest indication between the first user and the second user, thereby creating a match therebetween; a first user connection interest 336 which may indicate a connection interest (positive or negative) indicated by a first user ID 324 regarding a second user ID 326; and a second user connection interest 338 which may indicate a connection interest (positive or negative) indicated by a second user ID 326 regarding a first user ID 324, wherein a connection between the first user and the second user is created following mutual positive connection interest indications indicated by the first user and the second user;

Referring to FIG. 3B in conjunction with FIG. 2, a record of table 320 may be generated or updated as a result of step 206 of FIG. 2 where User A makes a positive or negative match interest indication regarding User B. If User B has already indicated a match interest in User A, either positive or negative, as queried in step 210, then a match and connection record has already been generated in table 320 comprising User A as a second user ID 326 and User B as a first user ID 324, and this record is updated in conjunction with step 206, otherwise a record is generated in conjunction with step 206. Table 2 below describes a relationship between an order of match interest indications for a User A and a User B and an assignment of a first user ID and second user ID comprised by a match and connection record.

TABLE 2

User ID Assignment for a Match and Connection Record

| User ID | User A Indicates Interest First | User B Indicates Interest First |
|---|---|---|
| First User ID 324 | User A | User B |
| Second User ID 326 | User B | User A |

In some implementations, match and connection status 328 may comprise statuses assigned status codes, such as disclosed in Table 3 below.

TABLE 3

Match and Connection Record Status Codes

| Status Code | Status Name | Status Description |
|---|---|---|
| 00 | First User Declined | Match rejected. Negative match interest indication received from a first user regarding a second user |
| 01 | Pending | Match pending. Positive match interest indication received from a first user regarding a second user |
| 02 | Express Pending | Express match pending. Express positive match interest indication received from a first user regarding a second user |
| 03 | Second User Declined | Match rejected. Negative match interest indication received from a second user regarding a first user |
| 04 | Matched | Matched. Reciprocal positive match interest indication received from a second user regarding a first user |
| 05 | Expired | Match window expired prior to completion of a qualifying video |

TABLE 3-continued

Match and Connection Record Status Codes

| Status Code | Status Name | Status Description |
|---|---|---|
| 06 | Connected | Connected. Mutual positive connection interest indications received from each of the matched users |
| 07 | Connection Blocked | Connection is blocked |

In some implementations, a connection system may comprise a feature for a user to reconsider candidate matches that the user had previously considered and rejected by selecting an undo rejected match function. An undo rejected match function could be made available as an enhanced service, pay-per-use service and or subscription based service. The availability and pricing of an undo rejected match function could be comprised by a record in a feature/service table. FIG. 3C is an example implementation of a feature/service table 350 which may be in a database accessed by data services 114 of FIG. 1B. Feature/service table 350 comprises records related to features and services and their availability in a basic service offering and subscription based service offerings of a connection service, and as a pay-per-use feature and service. In the example implementation of feature/service table 350, table 350 comprises records, wherein a record may comprise a feature/service ID 352 identifying feature or service, a feature/service description 354, a basic service availability indication 356, a tier 1 subscription availability indication 358, a tier 2 subscription availability indication 360, a pay-per-use pricing amount 362 and a pay-per-use quantity indicating the amount provided per a single pay-per-use purchase. In some implementations, feature/service table 350 may comprise the aforementioned express match feature comprising an express presentation of a first user's information to, and express interest in, a second user, wherein the express match feature may be available as a pay-per-use feature and/or included in subscription or basic service offerings.

In an undo rejected match function, the connection system may be configured to present a list of one or more recently rejected candidate matches. When a user makes a request to undo rejected matches, match and connection records having a status of 00 (first user declined) or 03 (second user declined), comprising the user's user ID as either a first user ID or second user ID, and having a negative user match interest (comprised by first user match interest 332 or second user match interest 334) indicated by the user (depending if the user is a first or second user of the match and connection record) may be retrieved beginning with a most recent record comprising such a rejection and may be limited to a maximum number of such records (e.g., 5, 10 or 20) and/or limited to a maximum time period (e.g., 1 day, 5 days or 10 days). A user may then review the pool of retrieved and previously rejected candidates for reconsideration. For any candidate in which the user now selects a positive interest, the associated match and connection record and status may be updated to reflect the new user match interest (332 or 334) indication and status 328. In some implementations, users are not presented with a candidate match which has already rejected them, namely, a user will not be presented with a candidate match when there is a match and connection record comprising a first user ID for the candidate match user, a second user ID for the user, a status of 00 (first user declined) and a negative first user match interest 332. In this case, the candidate match user has already established that they are not interested in a match with the user and the user is not presented with the candidate match for consideration. However, it is possible for both users to be presented with each other's information for match consideration during the same time and prior to either user indicating an interest indication, and therefore both may indicate interest indications. It is therefore possible for a first user match interest 332 to be negative and second user interest to be either null (no interest received), negative or positive. Table 4 below depicts the change of status for a first user match interest 332 being changed from a negative indication to a positive indication as part of an undo rejected match function.

TABLE 4

Match and Connection Record Change of Status Code Due to First User Match Interest Change from Negative to Positive

| Prior to Changed First User Match Interest | After Changed First User Match Interest |
|---|---|
| Status Code 328 = 00 (First User Decl.) | Status Code 328 = 01 (Pending) |
| First User Match Interest 332 = Negative | First User Match Interest 332 = Positive |
| Second User Match Interest 334 = Null | Second User Match Interest 334 = Null |
| Status Code 328 = 03 (Second User Decl.) | Status Code 328 = 03 (Second User Decl.) |
| First User Match Interest 332 = Negative | First User Match Interest 332 = Positive |
| Second User Match Interest 334 = Negative | Second User Match Interest 334 = Negative |
| Status Code 328 = 00 (First User Decl.) | Status Code 328 = 04 (Matched) |
| First User Match Interest 332 = Negative | First User Match Interest 332 = Positive |
| Second User Match Interest 334 = Positive | Second User Match Interest 334 = Positive |

In some implementations comprising express match, a first user may undo a negative indication and indicate an express positive indication for first user match interest 332 provided the second user match interest 334 is a null value. Upon such a change, the status would change from 00 (first user decline) to 02 (express pending) and the first user's information and express interest in the second user would be sent to the second user for a match consideration with the first user. If the second user match interest 334 is not a null value, then the second user has already been presented with the first user's information for a match consideration.

As noted, a match and connection record of table 320 is created following an indication of a first user match interest 332. As such, a first user match interest indication does not potentially comprise a null value as does a second user match interest 334. Table 5 below depicts the change of status for a second user match interest 334 being changed from a negative indication to a positive indication as part of an undo rejected match function for first user match interest 332 values of positive and negative.

TABLE 5

Match and Connection Record Change of Status Code Due to Second User Match Interest Change from Negative to Positive

| Prior to Changed Second User Match | After Changed Second User Match |
|---|---|
| Status Code 328 = 03 (Second User Decl.) | Status Code 328 = 04 (Matched) |
| First User Match Interest 332 = Positive | First User Match Interest 332 = Positive |
| Second User Match Interest 334 = Negative | Second User Match Interest 334 = Positive |
| Status Code 328 = 03 (Second User Decl.) | Status Code 328 = 00 (First User Decl.) |
| First User Match Interest 332 = Negative | First User Match Interest 332 = Negative |
| Second User Match Interest 334 = Negative | Second User Match Interest 334 = Positive |

In some implementations, a connection system may as a default restrict the number of matches a user may request, namely, restrict the number of positive match interest indications over a time period, for example, five per day, and offer additional match requests as a pay-per-use feature/service and/or as part of a subscription based service. For example, a purchase of a pay-per-use feature/service could provide additional match requests and increase the number from five to ten per day. Or a subscription package may offer up to ten per day, up to 50 per week, or both. Or as an additional example, a subscription package could offer unlimited match requests to a subscribing user. Similarly, in some implementations, a connection system comprising express match may as a default restrict the number of express matches a user may request over a time period, for example, one per day, and offer additional express matches as a pay-per-use feature/service and or as part of a subscription based service. For example, a purchase of a pay-per-use feature, could increase the number from one to five per day. Or a subscription package may offer up to five per day, up to 10 per week, or both. Or as an additional example, a subscription package could offer unlimited express matches to a subscribing user.

A connection system generally limits selection of candidate matches comprising a user location in a geographic area common with that of the user's user location. In some implementations, a connection system may offer a user the ability to receive candidate matches from a user specified alternative geographic area as an enhanced service, pay-per-use service and or subscription based service. For example, if a user is planning travel or routinely is traveling to a different geographic area from the user location comprised by their user profile, a different geographic location may be specified and the user may receive candidate matches from the different geographic area.

Feature/service table 350 may comprise records associated with the aforementioned enhanced candidate matching and selection services with the example feature/service IDs 01 through 04 depicted in table 6 below. Table 6 also depicts example feature/service IDs 05 through 15 associated with enhanced match and connection management services described later herein.

TABLE 6

Example Implementation of Feature/Service Record IDs, Names and Descriptions.

| Feature/ Service ID | Feature/Service Name | Feature/Service Description |
|---|---|---|
| 01 | Undo Rejected Match | Change a submitted match interest indication from a negative to a positive interest indication |
| 02 | Express Match Request | A quantity of (additional) express match requests |
| 03 | Match Requests | A quantity of (additional) match requests |
| 04 | Alternative Geographic Area | Receive candidate matches of an alternative geographic area |
| 05 | Chat Time Window Extension | Extend chat time window expiration by a quantity of time |
| 06 | Calendar Synchronization | Synchronize with user's calendar, e.g., Google Calendar and Apple Calendar, for video chat scheduling |
| 07 | Extended Qual. Video Chat | Extend a qualifying video chat past a normal maximum video chat time |
| 08 | Shortened Qual. Video Chat | Shorten qualification time for qualifying vide chat |
| 09 | Qualifying Video Chat Reattempt | Attempt another qualifying video chat |
| 10 | Additional Video Chat | Post connection video chat |
| 11 | Augmented Reality Qual. Video Chat | Augmented reality in a video chat such as virtual environments and ambiance setting (e.g., beach scenes and background music) |
| 12 | Filter/Overlay Qual. Video Chat | Filters and overlays for augmenting a user's image when participating in a video chat |
| 13 | Blind Date Qual. Video Chat | Video chat between preselected users where image of each user is blurred. If each user indicates positive connection interest, profile images are revealed |
| 14 | Speed Video Dating Qual. Video Chat | Multiple users participate in back to back qualifying video chats in a speed dating format |
| 15 | Video Chat Library Download | With mutual agreement, users may download their qualified video chat |

Enhanced Match and Connection Management Services

Video Chat Time Window and Video Chat Scheduling

As reflected in step 218 of FIG. 2, in some implementations, there may be a requirement to video chat within a time window commencing at a time in relation to the creation of a match (such as the time a match is created), which may be referred to as a chat time window. If a qualified video chat does not take place prior to the expiration of the chat time window, the match may expire and may be removed from a user's list of current matches. In some implementations, a connection system may, as depicted in example feature/service ID 05 of table 6 above, comprise an enhanced service, pay-per-use service and or subscription based service which enables a user to use, purchase for use or access via subscription a request for additional time to extend a chat time window. For example, a standard chat time window may be 48 hours and a user or pair of users may desire more time to schedule and complete a qualifying video chat. In such a scenario and some implementations, a user may by way of example, purchase an additional 24 hours thereby extending the chat time window to a total time of 72 hours. In some implementations, a user may purchase more than one extension, for example, up to three. In some implementations, additional extensions may become increasingly more expensive to purchase. In the case of a subscription based extension, some implementations may permit more than one, for example, up to five, and may enforce a supplemental payment for one or more of the extensions beyond the initial extension. A pay-per-purchase of a chat time window extension may result in a record entry in user purchases table 300 with a user ID 302 associated with the purchasing user, a feature/service ID 308 of 05 and a match and connection ID associated with the match for which the chat time window is being extended. In some implementations, the user (of the pair of matched users) that is not extending the chat time window, must agree to the extension or the chat time window is not extended.

In some implementations, a connection system may offer enhanced scheduling services to facilitate video chats between users by facilitating a process to schedule a video chat appointment. A user may wish to present to a matched user one or more potential times to video chat. In order to facilitate the presentation of potential times, enhanced scheduling services may include, as depicted in example feature/service ID 06 of table 6 above, a calendar synchronization feature to determine from a user's calendar and/or list of appointments, such as a user's Google Calendar, Apple Calendar and current list of video chat appointments, a list of available times which are within a remaining chat time window and show the list of available times to the user. A calendar synchronization feature associated with feature/service ID 06 could be made available as part of a subscription service, and thus be reflected in a tier 1 subscription availability 358 and/or tier 2 subscription availability 360, both of table 350 of FIG. 3C. The user may select from available times one or more potential times for presentation to the matched user. In some implementations, enhanced scheduling services may allow users to establish and maintain a set of preferred times of day, which may be variable by the day of week, and further which may be a prioritized set of times of day. In this manner, an enhanced scheduling service may show a prioritized list of available times to a user from which they may select one or more potential times to present to a matched user. If a user is not subscribed to a calendar synchronization service, then the user would research available times and suggest potential chat times.

The matched user is then presented with the one or more potential chat times from which a selection may be made, thereby creating a video chat appointment between the pair of matched users. In some implementations, when the one or more potential times are presented to the matched user, enhanced scheduling services may include, as depicted in example feature/service ID 06 of table 6 above, a calendar synchronization feature to determine from the matched user's calendar and/or list of appointments, such as a user's Google Calendar, Apple Calendar and current list of video chat appointments, which presented potential times are not available and display them differently than potential times which are available, such as greying the unavailable potential times (distinguishing them from, for example, green colored available potential times). If the matched user selects a time that is not greyed, namely a time which is mutually available, an appointment may then be created for a video chat and added to both users' video chat appointments. If the matched user selects a time that is greyed, enhanced scheduling services may present details of the schedule conflict, such as the calendar or appointment list comprising the conflict and associated details comprised therein. In some implementations, a user may choose to schedule the video chat appointment at the conflicting time regardless of, and in lieu of the conflict, and an appointment may then be created for a video chat and added to both users' video chat appointments. In some implementations, users subscribing to a calendar synchronization service may be given the option to indicate in a setting whether they want their calendar(s) updated to reflect the appointment, not be updated to reflect the appointment or be prompted on a new appointment to add or not add the appointment. In some implementations, users may be given the option to indicate in a setting whether they want to receive an email confirmation of the appointment, not receive an email confirmation of the appointment or be prompted on a new appointment to receive or not receive an email confirmation of the appointment. If a matched user presented with the one or more potential chat times from which a selection may be made, is not subscribed to a calendar synchronization service, the user may research available times and possible conflicts associated with presented potential times and make a selection thereof.

If a matched user does not accept any of the presented possible times, they may, reverse roles with a presenting user and in the aforementioned process, become the user presenting potential times. As long as the chat time window is active and not expired, the pair of matched users may continue to present and respond to potential times and reverse roles as needed until an appointment is successfully scheduled. In some implementations, enhanced scheduling services may comprise a feature to extend the chat time window, associated with feature/service ID 05 of table 6 above, as a pay-per-use feature and/or as a feature of a subscription based service. As a pair of users present potential times and respond thereto, an additional option to extend a chat time window may then be selected. In some implementations, an option to extend may be proffered by one user to the other user, wherein the user receiving the offer may accept the offer to extend the chat time window or the chat time window may not be extended. In some implementations, when a chat time window expires and an associated qualified video chat has not taken place, matched users may be given the option to add an additional chat time window, as a pay-per-use feature and/or as a feature of a subscription based service, wherein if neither user selects the option, an additional chat time window may not be added. In some implementations, a feature/service to add an additional chat time window may be a separate feature/service from the feature to extend a chat time widow associated with feature/service ID 05, or may be comprised thereby.

In some implementations, enhanced scheduling services may maintain a list of scheduled pending video chat appointments for each user such that a user may review their pending appointments, and enhanced scheduling services may provide users with alerts to remind them of upcoming appointments. In some implementations, users may be given the ability to specify settings that apply to all pending appointments indicating one or more alerts, e.g., a first alert 15 minutes before an appointment and a second alert one minute before an appointment, and adjust alerts for individual appointments. In some implementations, users may also reschedule an appointment. In some implementations, an option to reschedule a video chat time to delay its start time by an amount of time, such as 15 minutes may be provided, and/or the option to reschedule to another time may be given, e.g., 8:00 PM Wednesday, may be given. In some implementations, if the suggested time requires an extended chat time window, the proffering user may be notified of an associated pay-per-use fee or that the feature to extend a chat time window is associated with feature/service ID 05 of table 6 above is included in their subscription when considering proposing the new time. The proffering user, if subscribed, may use the aforementioned calendar synchronization feature associated with feature/service ID 06 to have enhanced scheduling services determine from the proffering user's calendar and/or list of appointments, such as a user's Google Calendar, Apple Calendar and current list of video chat appointments, a list of available times which are within a remaining chat time window, or in conjunction with a chat time window extension, and show the list of available times for rescheduling to the proffering user which may select from the available times one or more potential rescheduling times for presentation to the matched user for a rescheduling of a video chat appointment. When the one or more potential rescheduling times are presented to the matched user, if subscribed to the aforementioned calendar synchronization feature associated with feature/service ID 06, enhanced scheduling services may determine from the matched user's calendar and/or list of appointments, such as a user's Google Calendar, Apple Calendar and current list of video chat appointments, which of the presented potential rescheduling times are not available and display them differently than the potential rescheduling times which are available, such as greying the unavailable potential rescheduling times. If the matched user selects a time that is not greyed, namely a time which is mutually available, a rescheduled appointment may then be created for a video chat and added to both users' video chat appointments and the previous appointment may be removed or marked as canceled and rescheduled. In some implementations, the matched user may select a time that is greyed, and enhanced scheduling services may present details of the schedule conflict, such as the calendar or appointment list comprising the conflict and associated details comprised therein. A user may then choose to schedule the video chat appointment at the conflicting time regardless of, and in lieu of the conflict, and a rescheduled appointment may then be created for a video chat and added to both users' video chat appointments and the previous appointment may be removed or marked as canceled and rescheduled. Similar to a new appointment, in some implementations, users subscribing to the calendar synchronization feature associated with feature/service ID 06 may be given the option to indicate in a setting whether they want their calendar(s) updated to reflect the rescheduled appointment, not be updated to reflect the rescheduled appointment or be prompted on a rescheduled appointment to reflect or not reflect the rescheduled appointment. In some implementations, users may be given the option to indicate in a setting whether they want receive an email confirmation of the rescheduled appointment, not receive an email confirmation of the rescheduled appointment or be prompted on a rescheduled appointment to receive or not receive an email confirmation of the rescheduled appointment.

If a matched user does not accept any of the presented possible rescheduling times, they may, reverse roles with a presenting user and in the aforementioned process, become the user presenting potential rescheduling times. As long as the chat time window is active and not expired, or in conjunction with a chat time window extension, the pair of matched users may continue to present and respond to potential rescheduling times and reverse roles as needed until an appointment is successfully rescheduled.

Enhanced Match and Connection Management Services

Enhanced Video Chat Services

In some implementations, a connection service may offer a variety of enhanced video chat services, such as those associated with feature/services ID 07 through ID 15 of table 6 above, wherein an enhanced video chat service or group of services may be offered as basic services, pay-per-use services and/or subscription based services. In some implementations, enhanced video chat services may comprise features related to the number of video chats attempted and completed and the time duration of video chats, such as extended duration qualifying video chats, shortened qualifying video chats, qualifying video chat reattempts, multiple video chats both qualifying and potentially non-qualifying. In some implementations, enhanced video chat services may comprise features related to augmented reality, for example: creating virtual environments such as beach scenes, hiking, nature settings, etc.; creating ambiance settings, such as lighting effects, color toning, background music, etc.; and applying filters and overlays for augmenting a participant appearance. In some implementations, enhanced video chat services may comprise features related to video chat special events, such as speed video dating and video blind dates. In some implementations, enhanced video chat services may comprise a user video chat library, from which a pair of connected and mutually agreeing users may download a copy of their qualifying video chat.

Feature/service ID 07 of table 6 above relates to a feature to extend a qualifying video chat, wherein in some implementations, a connection system may comprise an enhanced service, pay-per-use service and/or subscription based service which enables a user to use, purchase for use or access via subscription a feature to add time to a qualifying video chat to extend the video chat past a normal maximum video chat time. Users may wish to extend a qualifying video chat for reasons such as they are enjoying their interaction and wish it to continue for a longer period of time or they feel they need more than the allotted qualification time to make an assessment and indication of a connection interest in the matched user.

Feature/service ID 08 of table 6 above relates to a feature to shorten a qualifying video chat, wherein in some implementations, a connection system may comprise an enhanced service, pay-per-use service and/or subscription based service which enables a user to use, purchase for use or access via subscription a feature to reduce the time duration needed to satisfy a qualification requirement to complete a qualifying video chat. Users may wish to shorten a qualifying video chat for reasons such as they feel they may make an assessment and indication of a connection interest in a matched user in less than the normally allotted time.

Feature/service ID 09 of table 6 above relates to a feature to reattempt a qualifying video chat, wherein in some implementations, a connection system may comprise an enhanced service, pay-per-use service and/or subscription based service which enables a user to use, purchase for use or access via subscription a feature to reattempt a qualifying video chat. Users may wish to reattempt a qualifying video chat for reasons such as they feel they need more video chat interaction to make an assessment and indication of a connection interest in the matched user.

Feature/service ID 10 of table 6 above relates to a feature to conduct a video chat between connected users, wherein in some implementations, a connection system may comprise an enhanced service, pay-per-use service and/or subscription based service which enables connected users to use, purchase for use or access via subscription a feature to video chat. In some implementations, ongoing post-connection communications between users may commonly be text based communications. Significantly more resources of a connection system may be required to control or host a video chat than resources needed to provide text based communications. An operator of a connection system may wish to provide video chat capability to connected users as an option for ongoing post-connection communications, but may choose to charge a pay-per-use fee, or make it available to subscribers via subscription and receive associated subscription fees to offset additional costs incurred.

Feature/service ID 11 of table 6 above relates to a feature to conduct a qualifying video chat comprising an augmented reality, wherein in some implementations, a connection system may comprise an enhanced service, pay-per-use service and/or subscription based service which enables users to use, purchase for use or access via subscription a feature to have a qualifying video chat comprising an augment reality, such as virtual environments (e.g., beach scenes, hiking, nature settings, etc.) and ambiance setting (e.g., lighting effects, color toning, background music, etc.).

Feature/service ID 12 of table 6 above relates to a feature to conduct a qualifying video chat comprising a filter or overlay augmenting a user's image, wherein in some implementations, a connection system may comprise an enhanced service, pay-per-use service and/or subscription based service which enables users to use, purchase for use or access via subscription a feature to have a qualifying video chat comprising a filter or overlay augmenting a user's image, such that a user may add a differentiating aspect to their appearance.

Feature/service ID 13 of table 6 above relates to a feature to conduct a "blind date" qualifying video chat, wherein in some implementations, a connection system may comprise an enhanced service, pay-per-use service and/or subscription based service which enables users to use, purchase for use or access via subscription a feature to request a "blind date" wherein two users participating in the blind date service are selected due to a potential compatibility and each user's interest in a blind date is solicited. If there is a mutual interest in a blind date, a match and connection record in table 300 comprising a "blind match" match and connection status 328 may be created wherein a blind match status code (note—this code is not shown in Table 3, Match and Connection Record Status Codes) may be specified. Blind matches may use the same scheduling process disclosed above, however, a user reviewing current matches will see a blind date match represented, wherein, in some implementations, information about the matched user may be nonexistent or limited and no profile images will be available unless blurred to prevent an assessment of the user. A blind date qualifying video chat between the selected users may be conducted wherein the image of each user is blurred. If each user indicates positive connection interest, a connection is created and profile images are then revealed to the participating users.

Feature/service ID 14 of table 6 above relates to a feature to participate in a speed video dating event comprising a plurality of qualifying video chats, wherein in some implementations, a connection system may comprise an enhanced service, pay-per-use service and/or subscription based service which enables users to use, purchase for use or access via subscription a feature to request a participation in a speed video dating event. In some implementations, a group of users participating in a speed video dating event are provided access to participate due, at least in part, to a potential compatibility with members of the group (such as geo location, fit with a specified selection criteria, etc.). In some implementations, to solicit participation, upcoming speed dating events may be published in advance within a connection service app or on a connection service website. In some implementations, users may propose a speed dating event and specify the compatibility and selection criteria, wherein an operator of the connection service may then chose to publish the proposed event as a sanctioned and upcoming event to solicit user participation. In some implementations, users may choose to be notified by email or alerts within the app of upcoming speed dating events for which they meet the compatibility and selection criteria. If there is sufficient interest in participation expressed to conduct the event, match and connection records may be created in table 300 between the participants (which may be based on pairing rules, male-female, same sex, either sex, as expressed in the compatibility and selection criteria), wherein a match and connection status 328 may be created comprising a speed dating status code (note—this code is not shown in Table 3, Match and Connection Record Status Codes). Details and images of user matches having a speed dating status code will not be visible to users when reviewing user current matches, however, pending speed dating events may be listed to provide a user with a more complete picture of the pending activities. In some implementations, to conduct a speed video dating session, each user registered to participate may be alerted to connect via their user device to the service in advance of the event start time, for example 5 minutes in advance and providing a sufficient number of registered users have connected prior to a cutoff time, for example one minute, the connected users may be notified the event will proceed in one minute (or otherwise based on another cutoff time that was used). In some implementations, a user communications controller (such as user communications controller 134 of FIG. 1B) may then initiate back-to-back qualifying video chats between the users, wherein each chat may be followed by requested connection interest indications from each user. For situations where there is not a balance of male and female participants to satisfy a specified male-female pairing rule, one or more users will not have a video chat during each chat session period within the event. In some implementations, these unused session periods may be slotted at the end of the event such that the one or more users may complete the event early. In some implementations, users may make a final review of their expressed connection interest indications and make adjustments thereto, and users may then be notified of any connections resulting from the event. In some implementations, users may not be given an opportunity to adjust their expressed interest indications, and users may be notified immediately during the event upon a reciprocal positive connection indication and the creation of a connection (with their last video chat partner). In some implementations, users who register and subsequently do not participate, or for users who start the event and abandon the event prior to completion, any associated speed dating match and connection records for which a video chat did not occur may be voided, such that the two users represented by the record are not limited in generating a match or connection in the future.

Feature/service ID 15 of table 6 above relates to a feature to download a video file of a qualifying video chat, wherein in some implementations, a connection system may comprise an enhanced service, pay-per-use service and/or subscription based service which enables users to use, purchase for use or access via subscription a feature, with mutual agreement, to download their qualified video chat. Users may wish to have a file of their qualifying video chat as an early record related to their relationship. For example, users may wish to show their "first date" at their wedding reception.

Enhanced User Policies and User Services

User Coaching Services

In some implementations, a connection service may offer user coaching services, wherein various coaching services may be offered as basic services, pay-per-use services, subscription based services or a combination thereof. In some implementations, coaching services may comprise peer-to-peer services where users which have been successful making connections within the service may offer coaching support to other users. In some implementations, coaching services may comprise expert services where trained relationship coaches offer coaching services to users. Expert coaches may review user information such as user profiles, user metrics (such as number of times considered as a candidate match, number of times of positive match interest, number of video chats attempted, number of qualified video chats, number of positive connection interest, etc.), feedback received on the user, videos of user video chats, etc. In some implementations, peer-to-peer coaches may have access to less information for review and may alternatively only have access to user profiles as seen by other users of the system, and receive other information only as conveyed directly by the user they are coaching. In some implementations, user feedback may be collected wherein a user reporting feedback may be anonymous and feedback may be restricted to expert coaches. In some implementations, video chats may be restricted to expert coaches and may protect the anonymity of the paired users within the video chat, by making visible only the user being coached. In some implementations, coaching services may comprise trial video chats for general user training or in preparation for a specific upcoming video chat.

Enhanced User Policies and User Services

Video Chat Library

In some implementations, a connection system may have a policy where they own all video chat content, and a policy where users may not capture streams and screenshots thereof. In some implementations, a video chat library may be maintained that may provide limited access to users to view their video chats, wherein such access may be for limited purposes, may require an active associated connection with the other user of the video chat (the paired user), and may further require the consent of the paired user of the video chat. A limited purpose may be, by way of example, to review a video chat before an in-person date or review a video chat before a post-connection video chat. In some implementations, a qualifying video chat file may be purchased and downloaded as described earlier herein in conjunction with feature/service ID 15.

Enhanced User Policies and User Services

Advanced Policy Enforcement

As discussed earlier, in some implementations, a connection service may allow users to report policy infractions and other concerning behavior of other users such that a user based policing procedure may be supported. For example, users may be automatically blocked from use upon a given number, such as three, reports being submitted regarding their policy infractions or concerning behavior. A blocked user would then have to successfully appeal to be reinstated to use of the system. In some implementations, a connection system may also comprise an advanced policy enforcement which may comprise image recognition software to scan user profile images and video chat images and to attempt to discern inappropriate content which may violate user policies for submitted content and user behavior while using the system. In some implementations, content which may be inappropriate may lead to an automatic suspension of a submitting or inappropriately behaving user, or may be flagged for audit by system personnel for a disciplinary action, such as a warning or suspension, to be taken.

Additional Applications

Some implementations disclosed herein have been disclosed in a context directed towards a personal relationship connection, such as in a context of dating or a finding a partner or friend. However, such disclosures have been illustrative and should not be used to limit the scope of the present disclosure. The social connection systems and methods and implementations thereof disclosed herein are applicable to a broad range of applications, such as: a business and/or consumer desiring to identify and connect with a doctor/medical professional, a therapist, a lawyer, a real estate agent, an interior decorator, a stylists, a travel guide, a contractor, a plumber, a painter, a light construction/renovation handyman, an electricians), a mechanic, a maid, a nanny, a babysitter, a nutritionists, a personal trainers, a personal life coach, a tutor a music teacher or other teacher, such as a language teacher or teacher of cooking classes.

While the principles of the disclosure have been described above in connection with specific methods and systems, it is to be understood that this description is made only by way of example and not limitation on the scope of the disclosure. Although several implementations have been illustrated and described in detail, it will be recognized that substitutions and alterations are possible without departing from the spirt and scope of the appended claims. Modifications, additions, or omission may be made to the methods described above without departing from the scope of the disclosure. Additionally, the steps may be performed in any suitable order without departing from the scope as well.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, software, firmware, and/or combinations of hardware, software or firmware. As used herein, the term module is intended to be broadly construed as hardware, software or firmware, and/or combinations of hardware, software or firmware.

It will be apparent that systems and/or methods, described herein, may be implemented in different forms of hardware, software, firmware, or combinations of hardware, software or firmware. The actual specialized control hardware or software code used to implement these systems and/or methods is not limiting of the implementations. Thus, the operation and behavior of the systems and/or methods were described herein without reference to specific software code, as it is understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set unless such combination is contradictory to the disclosure.

No element, act, or instruction used herein should be construed as required, critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more" unless it is stated or implicit that the set may be a null set. Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of facilitating controlled communication among users, the method comprising:
providing a system comprising:
a server configured to:
communicate over a communications network and interact with a plurality of user devices, each user device comprising a user interface operable by a user of the user device, wherein the user devices are configured to communicate over the communications network and interact with the server; and
receive positive interest indications from users interested in participating in a video chat; and
a communications controller, wherein the communications controller is comprised by the server and is configured to facilitate a video chat between a pair of users interested in a video chat;
receiving by the server, positive interest indications from each of a first user and a second user indicating an interest to participate in a video chat;
facilitating by the communications controller, a video chat between the first user and the second user via a first user device of the first user and a second user device of the second user;
determining by server that the video chat between the first user and the second user meets qualification requirements;
receiving by the server, via user devices:
a first further communication interest indication from the first user regarding the second user, wherein the first further communication interest indication is a first positive further communication interest indication thereby indicating that the first user is interested in further communication with the second user; and
a second further communication interest indication from the second user regarding the first user, wherein the second further communication interest indication is a second positive further communication interest indication thereby indicating that the second user is interested in further communication with the first user; and
enabling by the server, further communication between the first user and the second user based at least in part on the first further communication interest indication and the second further communication interest indication both being positive further communication interest indications.

2. The method of claim 1, wherein the first user and the second user are a preselected pair of users, and the method further comprising, blurring by the system of an image of the first user and an image of the second user during the video chat at least until the first positive further communication interest indication and the second positive further communication interest indication are received.

3. The method of claim 2, further comprising revealing by the system of at least one profile image of the first user to the second user and at least one profile image of the second user to the first user, wherein the revealing is at least in part due to receiving the first positive further communication interest indication and the second positive further communication interest indication.

4. The method of claim 1, wherein the first user and the second user are users from a group of users of a group event having a plurality of video chats, and the method further comprising, facilitating by the communications controller of a plurality of video chats between users having indicated positive interest in participating in video chats of the group event.

5. The method of claim 4, wherein in response to the receiving by the server of the first positive further communication interest indication and the second positive further communication interest indication, the method further comprising, notifying by the server to the first user and the second user that they are connected, thereby indicating that they are enabled for further communications.

6. The method of claim 1, further comprising:
facilitating by the communications controller, a video chat between a third user and a fourth user via a third user device of the third user and a fourth user device of the fourth user, wherein the system comprises positive interest indications that the third user and the fourth user are interested in participating in a video chat;
determining by server that the video chat between the third user and the fourth user meets qualification requirements;
receiving by the server:
a third further communication interest indication from the third user regarding the fourth user thereby indicating whether the third user is interested in further communication with the fourth user; and
a fourth further communication interest indication from the fourth user regarding the third user thereby indicating whether the fourth user is interested in further communication with the third user; and
enabling by the server, further communication between the third user and the fourth user if both of the third further communication interest indication and the fourth further communication interest indication are positive further communication interest indications.

7. The method of claim 6, wherein at least one of the third further communication interest indication and the fourth further communication interest indication is not a positive further communication interest indication, and as a result of the at least one of the third further communication interest indication and the fourth further communication interest indication not being a positive further communication interest indication, the method further comprising not enabling by the server of further communication between the third user and the fourth user.

8. The method of claim 7, wherein the third user and the fourth user are a preselected pair of users, the method further comprising:
blurring by the system of an image of the third user and an image of the fourth user when participating in the video chat; and
not revealing by the server a profile image of the third user to the fourth user and a profile image of the fourth user to the third user as a result of the at least one of the third further communication interest indication and the fourth further communication interest indication not being a positive further communication interest indication.

9. The method of claim 7, wherein the third user and the fourth user are a pair of users from a group of users of a group event having a plurality of video chats, and the method further comprising:
facilitating by the communications controller of a plurality of video chats between users having indicated positive interest in participating in video chats of the group event; and
in response to the at least one of the third further communication interest indication and the fourth further communication interest indication not being a positive further communication interest indication, not notifying by the server the third user and the fourth user of a creation of a connection between the third user and the fourth user.

10. The method of claim 1, wherein the positive interest indication of the first user is an express positive interest indication, and the positive interest indication of the second user is in response to receiving at least a portion of a first user profile of the first user sent in response to the express positive interest indication.

11. The method of claim 10, wherein the express positive interest indication is in response to the first user receiving at least a portion of a second user profile of the second user.

12. A system for facilitating controlled communication among users, the system comprising:
a server configured to communicate over a communications network;
a plurality of user devices, each user device comprising a user interface operable by a user of the user device, wherein the user devices are configured to communicate over the communications network and interact with the server, wherein the server is configured to receive via user devices positive interest indications from users interested in participating in a video chat; and
a communications controller, wherein the communications controller is comprised by the server and is configured to facilitate a video chat between a pair of users interested in a video chat, wherein
the server is further configured to:
determine if the video chat between a pair of users interested in a video chat meets qualification requirements, wherein if the video chat meets qualification requirements, the server is further configured to:
receive, via user devices, a further communication interest indication from each user of the pair of users having engaged in the video chat regarding the other user of the pair of users having engaged in the video chat; and
enable further communication between the users of the pair of users having engaged in the video chat if each user of the pair of users having engaged in the video chat indicates a positive further communication interest indication.

13. The system of claim 12, further comprising a blind date feature, wherein a pair of users participating in a blind date feature are a preselected pair of users and the system is configured to blur an image of each user when participating in a video chat at least until a positive further communication interest indication from each user regarding the other user is received.

14. The system of claim 13, wherein the system is further configured to reveal at least one profile image of each user to the other user of the pair of users participating in the blind date feature only if a positive further communication interest indication from each user regarding the other user is received.

15. The system of claim 12, further comprising a speed dating feature, wherein users participating in a speed dating feature are users from a group of users of a group event having a plurality of video chats, and the communications controller is further configured to facilitate a plurality of video chats between pairs of users having indicated positive interest in participating in video chats of the group event.

16. The system of claim 15, wherein, in response to a receiving by the server of a positive further communication interest indication from each user of a pair of users having participated in a video chat of the group event, the server is further configured to notify each user of the pair of users that they are connected, thereby indicating that the pair of users is enabled for further communications with each other.

17. The system of claim 12, wherein:
the communications controller is further configured to control video chats facilitated between a pair of users using a communications signaling protocol;
each user device of each user of a pair of users engaging in a video chat controlled by the communications controller is configured as an endpoint for video streams of the video chat; and
the communications controller controls the initiation of the video streams of the video chat and the termination of the video streams of the video chat between the user devices configured as the endpoints for the video chat between the pair of users.

18. The system of claim 12, wherein:
the communications controller is further configured to control video chats facilitated between a pair of users by controlling relayed video streams of the video chat, relayed by an intermediate host;
each user device of each user of a pair of users engaging in a video chat controlled by the communications controller is configured as an endpoint for video streams of the video chat; and
the communications controller controls the initiation of the video streams of the video chat and the termination of the video streams of the video chat between the user devices configured as the endpoints for the video chat between the pair of users.

19. A non-transitory computer-readable medium comprising instructions that, when executed by one or more processors, the one or more processors are configured to:
communicate over a communications network, wherein the one or more processors interact with a plurality of user devices, each user device comprising a user interface operable by a user of the user device;
receive by the one or more processors via user devices, positive interest indications from users interested in participating in a video chat;
facilitate by the one or more processors, a video chat between a first user and a second user of a pair of users, each user having indicated positive interest indications regarding a video chat;
determine by the one or more processors, that the video chat between the first user and the second user meets qualification requirements;
receive by the one or more processors via a first user device, a first further communication interest indication from the first user regarding the second user, wherein the first further communication interest indication is a first positive further communication interest indication thereby indicating that the first user is interested in further communication with the second user;
receive by the one or more processors via a second user device, a second further communication interest indication from the second user regarding the first user, wherein the second further communication interest indication is a second positive further communication interest indication thereby indicating that the second user is interested in further communication with the first user; and enable by the one or more processors, further communication between the first user and the second user based at least in part on the first further communication interest indication and the second further communication interest indication both being positive further communication interest indications.

20. The non-transitory computer-readable medium of claim 19, further comprising instructions that, when executed by the one or more processors, the one or more processors are further configured to:
- facilitate by the one or more processors, a video chat between a third user and a fourth user of a pair of users having indicated positive interest indications regarding a video chat;
- determine by the one or more processors, if the video chat between the third user and the fourth user meets qualification requirements, wherein if the video chat meets qualification requirements, the one or more processors are further configured to:
- receive by the one or more processors via a third user device, a third further communication interest indication from the third user regarding the fourth user;
- receive by the one or more processors via a fourth user device, a fourth further communication interest indication from the fourth user regarding the third user; and
enable by the one or more processors, further communication between the third user and the fourth user if each of the third further communication interest indication and the fourth further communication interest indication is a positive further communication interest indication.

21. The non-transitory computer-readable medium of claim 19, further comprising instructions that, when executed by one or more processors, the one or more processors are further configured to blur by the one or more processors, an image of each user of a pair of users that are a preselected pair of users preselected for a blind date when participating in a blind date video chat at least until a positive further communication interest indication from each user regarding the other user is received.

22. The non-transitory computer-readable medium of claim 19, further comprising instructions that, when executed by one or more processors, the one or more processors are further configured to facilitate by the one or more processors, a plurality of video chats between users having indicated positive interest in participating in video chats of a group event, wherein the first user and the second user are a pair of users from a group of users of the group event.

* * * * *